(12) United States Patent
Van Raamsdonk et al.

(10) Patent No.: US 8,798,920 B2
(45) Date of Patent: Aug. 5, 2014

(54) GENERATING A DISPLAY IMAGE

(75) Inventors: Ewoud Van Raamsdonk, Utrecht (NL); Simone Tertoolen, Rotterdam (NL)

(73) Assignee: Tomtom International B.V., Amsterdam (NL)

( * ) Notice: Subject to any disclaimer, the term of this patent is extended or adjusted under 35 U.S.C. 154(b) by 466 days.

(21) Appl. No.: 12/736,403

(22) PCT Filed: May 29, 2008
(Under 37 CFR 1.47)

(86) PCT No.: PCT/EP2008/004391
§ 371 (c)(1),
(2), (4) Date: Mar. 24, 2011

(87) PCT Pub. No.: WO2009/143868
PCT Pub. Date: Dec. 3, 2009

(65) Prior Publication Data
US 2011/0264362 A1    Oct. 27, 2011

(51) Int. Cl.
*G01C 21/00*    (2006.01)
(52) U.S. Cl.
USPC .......................................... 701/436; 701/411
(58) Field of Classification Search
USPC .................... 701/400, 408–410, 436
See application file for complete search history.

(56) References Cited

U.S. PATENT DOCUMENTS

| | | | |
|---|---|---|---|
| 6,710,774 B1 | 3/2004 | Kawasaki et al. | |
| 7,835,857 B2 | 11/2010 | Gretton | |
| 2007/0172147 A1* | 7/2007 | Fujiwara et al. | 382/276 |
| 2007/0233369 A1* | 10/2007 | Ng et al. | 701/208 |
| 2008/0195315 A1* | 8/2008 | Hu et al. | 701/212 |
| 2008/0243380 A1* | 10/2008 | Han | 701/211 |
| 2009/0021514 A1* | 1/2009 | Klusza | 345/419 |
| 2009/0082960 A1* | 3/2009 | Ramaswamy et al. | 701/211 |
| 2010/0299062 A1 | 11/2010 | Gretton | |

FOREIGN PATENT DOCUMENTS

| | | |
|---|---|---|
| CN | 1754082 A | 3/2006 |
| CN | 1934418 A | 3/2007 |
| DE | 100 23 160 | 11/2000 |
| JP | 2000293668 A | 10/2000 |
| JP | 2001027535 A | 1/2001 |
| JP | 2001108458 A | 4/2001 |
| JP | 2002107154 A | 4/2002 |
| JP | 2002188928 A | 7/2002 |
| JP | 2005345299 A | 12/2005 |
| JP | 2007026201 A | 2/2007 |
| TW | 200533944 A | 10/2005 |

OTHER PUBLICATIONS

International Preliminary Report on Patentability and Written Opinion for International application No. PCT/EP2008/004391 dated Nov. 30, 2010.

* cited by examiner

*Primary Examiner* — Hussein A. Elchanti

(57) ABSTRACT

A method is disclosed for generating a display image including a map view and a road, the map view being a three dimensional perspective elevation view of a portion of a digital map as viewed from a viewing position. In at least one embodiment, the method includes determining, from information associated with the distance of the road that is to be displayed in the display image from the viewing position, whether a map object obscures a line of sight from said viewing position to the road in the three dimensional perspective elevation; and displaying an element of the road in a format that is dependent on whether the map object is determined to obscure said line of sight. An apparatus and a computer program are also disclosed.

16 Claims, 7 Drawing Sheets

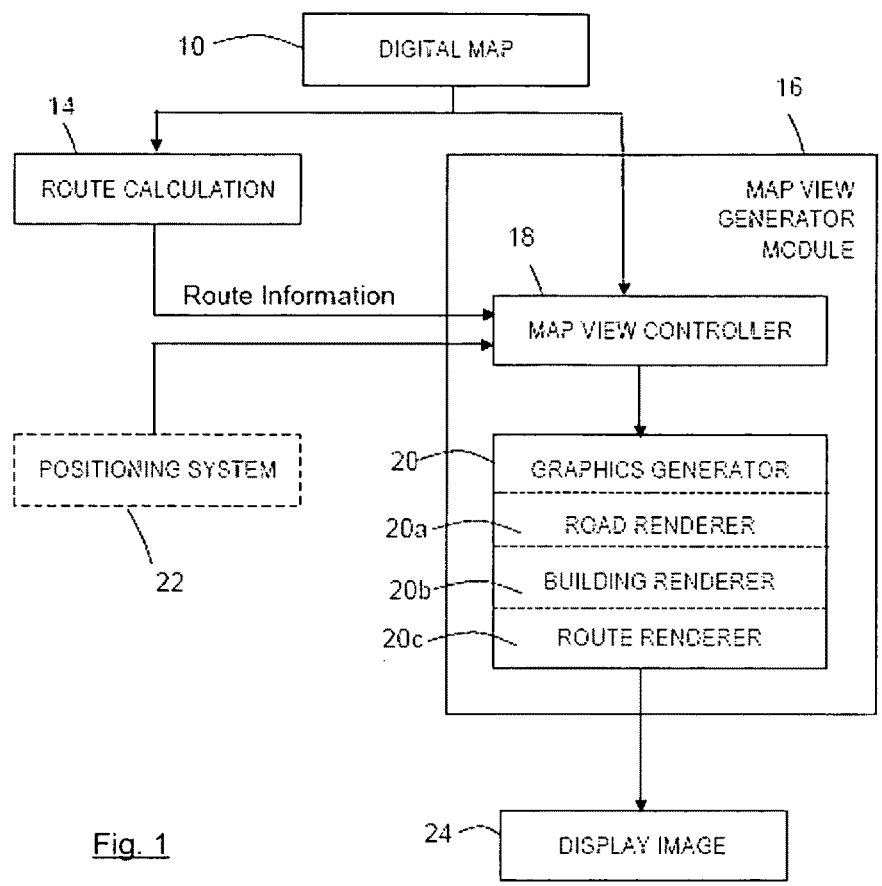
Fig. 1
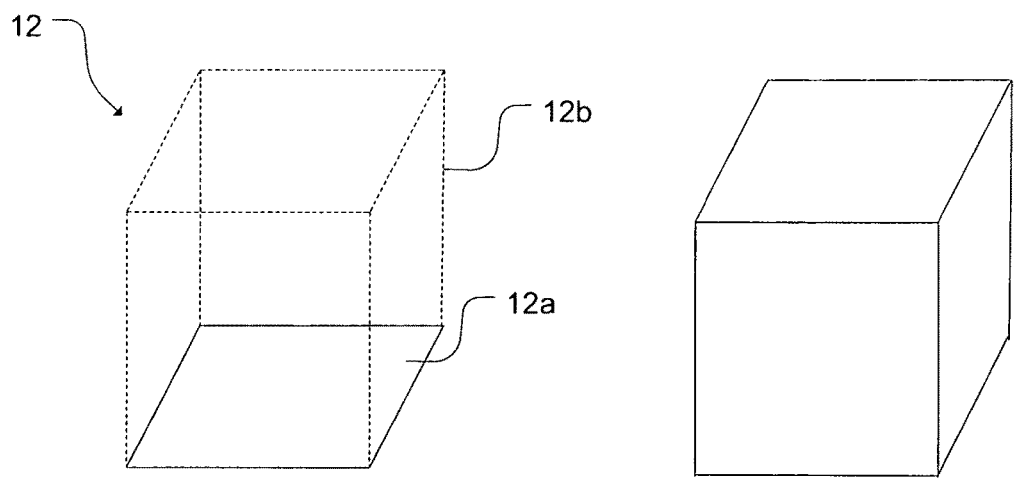
Fig. 2a
Fig. 2b

GENERATING A DISPLAY IMAGE

FIELD OF THE INVENTION

This invention relates to an apparatus and method for generating a display image including a map view and a road. The invention is especially, although not exclusively, suitable for navigation devices, including portable navigation devices (so-called PNDs).

BACKGROUND TO THE INVENTION

Typically, a navigation device (be that an in-vehicle navigation device (i.e. a navigation device built into a vehicle and which cannot be removed from that vehicle); a PND such as a TomTom® Go 720 or similar; or a mobile telephone, personal digital assistant (PDA) or computer (e.g. a PC) executing navigation software) is configured to display an image consisting of a map view generated from a digital map, and superposed with route information depicting a navigation route. The route information may be pre-recorded, but typically it is the result of a route-planning algorithm executed by the navigation device using suitable software. The navigation device may also include a position determining system (such as Global Positioning System (GPS)) for determining the current real-time position of the navigation device, and for dynamically adjusting the map view in accordance with the determined current position. Various types of map views are known including:

(i) A two-dimensional-based map view that includes information in two-dimensions at ground level. For example, roads and buildings are represented by the shape of their footprints on the ground. Such two-dimensional information may be viewed as a plan (i.e. looking vertically downwardly on the map, in the same manner as a traditional paper map), or in artificial perspective as if viewing a traditional flat paper map from a perspective angle. However, in either case, the map view is "flat" in the sense that the information is only two-dimensional ground level information.

(ii) A three-dimensional-based perspective elevation view in which one or more digital map features or objects are presented in three dimensions. For example, a building is depicted showing the building's facades and a building height, which is a closer representation to the real world.

Many users find a three-dimensional perspective elevation view to be more intuitive than a two-dimensional flat view, especially when viewing the map at a relatively large display scale and/or for a built-up area during navigation. This is because the three-dimensional perspective and height information of objects depicted in the display more closely resembles these features as seen by the eye. For example, a person walking or driving at ground level sees building facades of certain height, rather than an abstract footprint of the building on the ground. The three-dimensional perspective information may therefore provide many users with more intuitive visual cues that aid the user to matching the display to what the user is seeing, and to follow the navigation route.

The above is especially true for a portable navigation device (PND), such as for handheld or in-vehicle use. In the case of in-vehicle use when following a predetermined route, a highly intuitive navigation display is desired that (i) provides the driver with current navigation information, (ii) provides an indication of the future route, so that driver can drive and position the vehicle appropriately, and (iii) avoids burdening the driver's attention, in order to allow the driver to drive the vehicle safely.

While a three-dimensional perspective elevation view is desirable for its intuitiveness, it can nevertheless result in additional display complications in terms of what the user is able to see in the map view. For example, in a two-dimensional plan view (which corresponds to looking vertically downwards onto the map), there is no three-dimensional perspective of each map object, and no obscuring of one map object in front of another. However, in a three-dimensional perspective elevation view at ground level a relatively tall map object, such as a building, may obscure another item of map information in the display, such as a road. This situation could be remedied by reverting to a two-dimensional plan view, but this would necessarily remove three-dimensional information in the view, and thereby reduce the benefit in terms of the intuitiveness of the view.

The present invention has been devised to address these contradictory issues.

SUMMARY OF THE INVENTION

In pursuit of this aim, a presently preferred embodiment of the present invention provides a technique for generating a display image including a map view and a road, the map view being a three dimensional perspective elevation view of a portion of a digital map as viewed from a viewing position, and the method characterised by:
(a) determining, from information associated with the distance of the road that is to be displayed in the display image from the viewing position, whether a map object obscures a line of sight from said viewing position to the road in the three dimensional perspective elevation; and
(b) displaying an element of the road in a format that is dependent on whether the map object is determined to obscure said line of sight.

This technique may be defined as a method, or an apparatus implementing the technique, or a computer program which implements the technique when executed.

When the line of sight to the road is determined to be obscured by the map object, at least part of the part of the road that is obscured may be displayed in a format that permits the map object and at least part of the road to simultaneously be viewed even though in actuality the map object obscures the road. For example, at least part of the portion of the road obscured by the map object may be displayed in an at least partly transparent format superposed on the map object.

In one embodiment of the present invention, the road may comprise a route between a start point and an end point. In another embodiment of the present invention, the road may comprise a road adjoining a route.

Features and advantages of the invention include (i) the ability to present a three-dimensional perspective elevation view in which at least part of the road information remains at least partly visible even when the three-dimensional shape of a map object would otherwise obscure that road information, and (ii) avoiding the contradictory issues described above. Other features and advantages of the invention will become apparent from the following description of preferred embodiments. While features believed to be of significance have been identified above and in the appended claims, the Applicant claims protection for any novel feature or idea described herein and/or illustrated in the drawings, whether or not emphasis has been placed thereon.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 1 is a schematic illustration showing information flow for generating a map view in a first embodiment;

FIGS. 2a and 2b are a schematic illustrations depicting information stored in a digital map for a three-dimensional map object, and a rendered three-dimensional object;

DETAILED DESCRIPTION OF PREFERRED EMBODIMENTS

Figure 3:
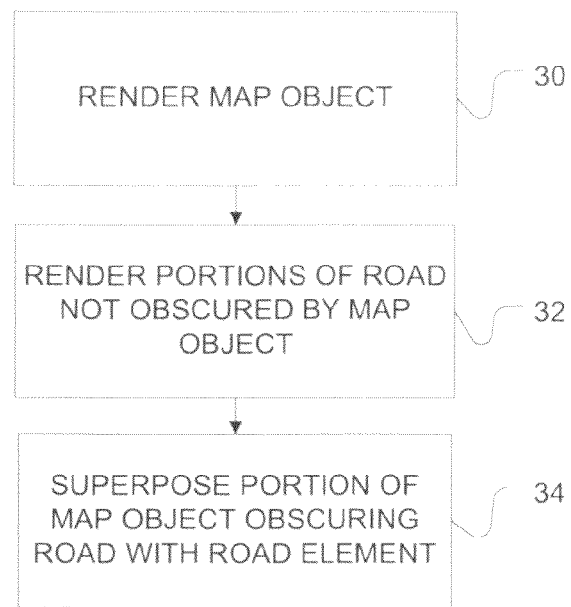
FIG. 3 is a schematic flow diagram showing a first technique in accordance with the teachings of the present invention.

Preferred embodiments of the present invention are described hereafter with particular reference to a PND that is configured to display a three-dimensional perspective elevation view of a digital map on which one or more roads are superposed. It should be noted, however, that the arrangement hereafter described is merely illustrative and not intended to limit the scope of the present invention. For example, the teachings of the present invention could be equally implemented in an arrangement where a route is not being followed, such as a so-called "free driving" mode where the PND displays a map of the area in which it is located without also displaying a route to a selected destination. The following description will also make particular reference to map objects in the form of buildings, but it should be noted that the teachings of the present invention may be more broadly applied to any type of map object.

FIG. 1 depicts schematically information flow used in a first embodiment, for processing information from a digital map 10, to generate a display image 24 including a map view and superposed roads within the map view. It will be appreciated that FIG. 1 is not intended to represent a limiting architecture for implementing the invention. Instead, it merely represents an example of information flow between various processing stages. The digital map 10 stores information representing, amongst other things, the positions of roads, and other map objects such as buildings. At least some of the map objects are stored with three dimensional information, including the height of the map object. FIG. 2a shows an example of a map object in the form of a building 12. The building is represented in the digital map 10 as first information 12a defining the shape of the building's footprint on the ground, and second information 12b defining the height of the building. The first information 12a may represent a sequence of connected points, and typically defines a closed shape (although the shape may have one or more interior voids representing, for example, an open area or courtyard inside the building). This type of representation enables the building shape to be stored in a highly compressed form, assuming that the building has a regular shape that is a uniform projection of its ground footprint. The building can be displayed relatively easily in three dimensions in a map view by projecting the ground footprint 12a to the height 12b of the building, and rendering the facades of the structure, as shown in FIG. 2b, with suitable colour or shading to depict a solid three-dimensional structure.

In addition to information regarding the footprint 12a of the building, the map also includes information concerning the geographical position of the building. For example, the footprint could be defined by a series of connected points that are each associated with coordinate data (for example longitude and latitude data), or in another implementation one point could be associated with such data and the position of the other points defining the footprint could be defined in relation thereto. A variety of different techniques are known in the art, and as such it suffices for the purposes of the present invention to indicate that the geographical position of the building object is known. Similarly, a map object such as a road could be defined by means of a start position and a vector or alternatively by means of a start position and an end position, where the start position and the end position could comprise coordinate data, for example longitude and latitude information. Again for the purposes of this invention it suffices to note that the geographical position of the road is known.

Returning to FIG. 1, information from the digital map 10 can be supplied to a route calculation module 14 and to a map view generator module 16. The route-calculation module 14 is configured to plan a navigation route between a geographical start position and a geographical end position selected by a user. The user may also provide additional route criteria, such as passing through one or more intermediate locations selectable by the user, or for using certain types of road or other transportation routes. If a route is calculated, the route-calculation module 14 provides the calculated route information to the map view generation module 16 for superposing the route information in the map view for display. The map view generation module 16 typically comprises sub-modules including, by way of example, a map view controller 18, and a graphics generator 20 responsive to the controller 18. The map view controller 18 manages a map view, by controlling which information is retrieved from the digital map 10, how the information is to be displayed as the map view, and how roads are to be superposed in the map view. The map-view controller module 16 also dynamically controls a location "window" on to the digital map (e.g. the portion of the digital map displayed in the map view). For example, the location window may depend on the current real-time position of a user as may be determined by an optional position determining module 22, for example, a GPS or other satellite/wireless signal based positioning system. Alternatively, the location window may be a location selected by the user. The graphics generator 20 includes one or more graphics engines for generating, or composing, the display image 24, pixel-by-pixel, on the basis of the map view information managed by the controller 18. The graphics engines may include, or execute commands to implement, a road renderer 20a, a building renderer 20b, and a route information renderer 20c for superposing the route information in the map view, as well as other custom graphics commands or engines.

In general terms, a feature of the present invention is the implementation of a technique for managing generation of a three-dimensional perspective elevation view by generally:

(i) determining from information associated with the distance of a road that is to be displayed in the display image from a viewing position, whether a map object, such as a building, obscures a line of sight from said viewing position to the road in the three dimensional perspective elevation; and (ii) displaying an element of said road in a format that is dependent on whether the map object is determined to obscure said line of sight.

FIG. 3 is a schematic representation of the steps of a process for implementing this technique. In a first step 30 of the process data concerning a map object, in this particular example a building, in the map view is retrieved from the digital map 10 and rendered in memory to provide a three-dimensional view of the map object as viewed from a predetermined viewing position.

In a second step 32 of the process data concerning a road that is to be displayed in the map view is retrieved from the digital map 10, and in accordance with the present technique only those portions of the road that are determined not to be obscured by the map object (i.e. all of the road within the map view that is not behind the building) as viewed from the viewing position, are rendered.

In a third step 34 of the process, the map object is superposed with a road element that extends at least partway between the portions of the road that are visible to one or both sides of the map object. The road element may, in one embodiment, be configured so that it is at least partly transparent, and such an arrangement allows the map object to be viewed through the road to thereby provide a visual impression to the viewer of the road extending behind the map object that obscures it.

In another embodiment the road element may be configured to gradually fade intensity over a predetermined distance (for example by gradually reducing the intensity of the shading applied to the road element) from the point where the road meets the map object in the three-dimensional perspective elevation view, and then reappear with full shading from the other side of the map object.

In one embodiment of the present invention, this functionality can readily be implemented using a technique that is well known in the field of computer graphics, namely the technique of depth buffering (also known as z-buffering).

In general terms, z-buffering is the management of image depth coordinates in three-dimensional (3-D) graphics, and may be accomplished in hardware or software. It is one solution to the visibility problem, which is the problem of deciding which objects of a rendered scene are visible, and which are hidden by other objects in that scene.

When an object in a scene is rendered each pixel of the screen that is allocated to the display of that object is assigned a depth "z" which corresponds to the distance of the part of the object rendered in that pixel from the viewing position for the scene. The z values for a rendered object are stored in a buffer (known as the z-buffer or depth buffer) which is usually arranged as a two-dimensional array (x-y) with one element for each screen pixel.

When a first object of a scene is rendered, each element of the two-dimensional array that corresponds to a pixel that will display a constituent part of the rendered object is populated with a z value which denotes the distance of that constituent part from the viewing position.

If, when a subsequent object of the scene is rendered, part of that subsequent object needs to be displayed by pixels that are already allocated to the display of the first rendered object, the depths (z values) for each element of the array that is associated with the corresponding portions of each object are compared, and the portion of the object that has the smaller z value (i.e. the portion of the two objects that is closer to the viewing position) is selected in preference to the portion of the object that has the larger z value (i.e. the portion of the two objects that is further from the viewing position). The depth of this selected portion is then saved to the z-buffer, replacing the old one, and if we assume that the subsequent object is closer to the viewing position than the first object, then in the resulting image a part of the subsequent object will be superposed on the first object, thereby obscuring that part of the first object from display.

Figure 4A:
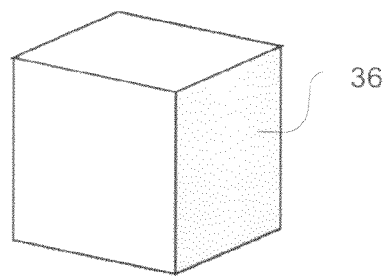
FIGS. 4a to 4c are schematic illustrations of map objects and roads.

Referring now to FIGS. 4a to 4c and FIG. 5, in accordance with a first embodiment of the present invention data pertaining to a map object, in this instance a building 36, is retrieved from the digital map 10 in step 40a and a z-buffer is populated with data for the map object in step 40b. Next the map object is rendered in step 40c to provide a three dimensional view of a building as depicted in FIG. 4a. To illustrate the teachings of this embodiment, the map view will be assumed to comprise a single map object, and that map object will be assumed to be part of a map view where a road extends from a start position, behind the map object to an end position.

Next, in step 40d, data for the road is retrieved from the digital map 10 and the z-buffer is populated with road data in step 40e, following which the road is rendered in step 40f. In the course of the rendering process, and as aforementioned data pertaining to any map object constituent parts that are already in the buffer and are further from the viewing position than the road is replaced with road data (although for the purposes of illustrating this embodiment it is assumed that there are no such map objects). In addition, as above described, any map object constituent parts that are closer to the viewing position than the road are not replaced with road data in the z-buffer.

Figure 4B:
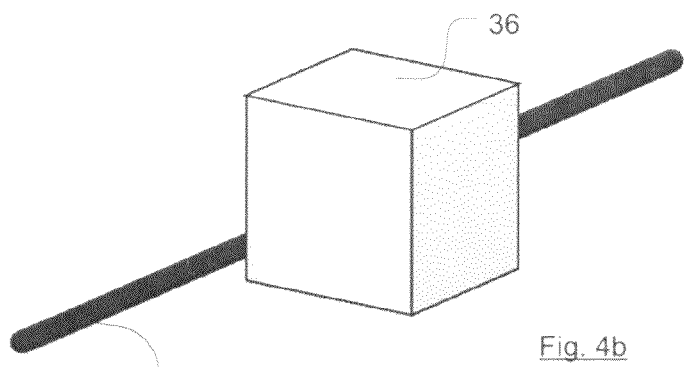

Once the road has been fully rendered and the z-buffer fully populated with road data to the extent applicable for the map view in question the resulting map view will appear as shown in FIG. 4b. As shown in FIG. 4b, the road 42 cannot be seen whilst it passes behind the building 36, and whilst this is not too much of a problem when there is only a single map object in front of the road, it will readily be appreciated that it will become progressively easier to lose track of the road as the number of buildings in front of it increases.

To address this drawback, the component parts of the road are each considered in step 40g and a determination is made in step 40h as to whether the z-buffer indicates that the map object obscures (i.e. is closer to the viewing position) the particular part of road currently being considered.

If the map object is further away from the viewing position than the particular part of road data currently being considered, processing reverts to step 40g and the next road segment is considered. If, however, the determination made in step 40h is that the z-buffer does indicate that the map object obscures the part of road currently being rendered, processing moves to step 40i and that part of the road is drawn in the map view as a road element 44 that is superposed on the map object 36.

Next a check is made in step 40j as to whether all relevant segments of the road have been considered, and if not processing reverts to step 40g. If all relevant segments of road have been considered, processing halts at step 40k.

Figure 4C:
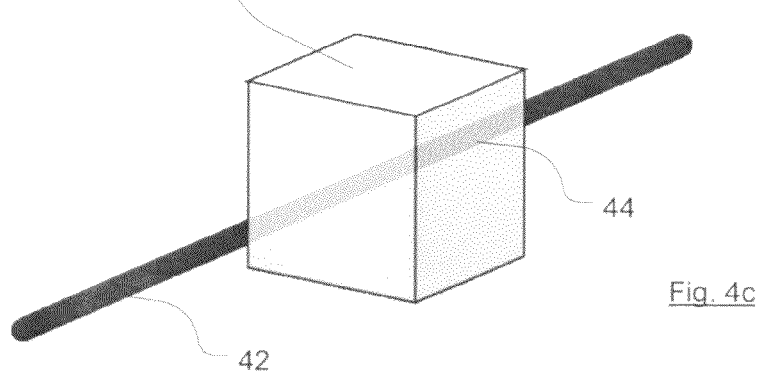

In the preferred embodiment the road element 44 that is drawn in place of that part of the road that is obscured by the map object comprises, as depicted in FIG. 4c, a section of road that is the same colour as the components of the road that are not obscured by the map object, but is at least partly transparent. The advantage of this is that the transparent map element superposed over the map object enables the viewer of the image to see both the road and the map object behind the road, and as such the viewer of the image is much less likely to lose track of the road. Furthermore, by maintaining the colour of the road as it passes behind the building, the user can more readily follow the road in the display.

In one particularly preferred aspect of this embodiment, the road comprises a route that has been calculated from a start position to an end position, and in this instance the fact that the viewer can "see" the route behind the building makes it significantly easier for the viewer to correctly follow that route, for example whilst driving their vehicle. Yet another advantage of this arrangement is that it improves the clarity of the display for a user following the road or route, without losing any of the three-dimensional information that provides the viewer with a very intuitive display.

In a modification of this arrangement the road element superposed on the map object could take any one of a number of different forms. For example, the road element could be of a different colour, stippled or otherwise patterned so that a viewer of the image can distinguish it from adjacent sections of road. The road element need not necessarily be continuous and could comprise by one or more dotted lines.

Figure 6:
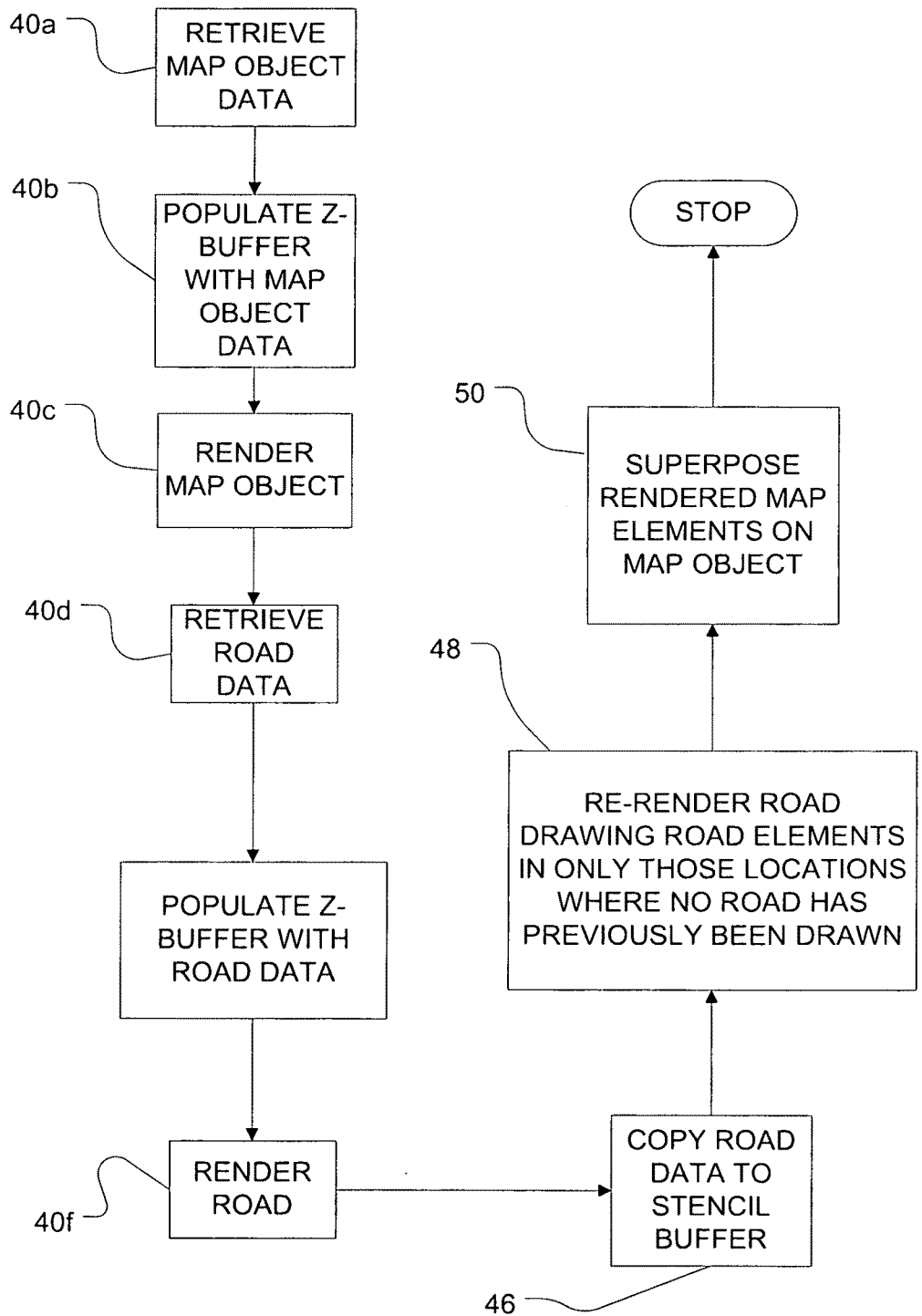
FIG. 6 is a flow diagram depicting the steps of an illustrative process in accordance with an embodiment of the invention.

In an alternative implementation of this technique, depicted schematically in FIG. 6, a stencil buffer is employed to indentify the segments of road that are to be drawn as a road element superposed on the map object.

Stencil buffers, like z buffers, are well known tools that are often employed in 3D imaging and computer graphics in general. As the name implies, the stencil buffer defines a stencil with "holes" that can subsequently be populated with desired graphical features. A stencil buffer comprises, like a z-buffer, an X-Y array of elements which are populated with data corresponding to pixels of a display image. However, unlike a z-buffer where the positional relationship of map objects within a map view is defined, the stencil buffer instead defines one or more regions of a display item that have not been rendered. These regions are the "holes" in the stencil, and by redrawing a display item with reference to a stencil buffer it is possible to fill in only the "holes" in the stencil with data items and render those data items to provide an image for display.

Figure 5:
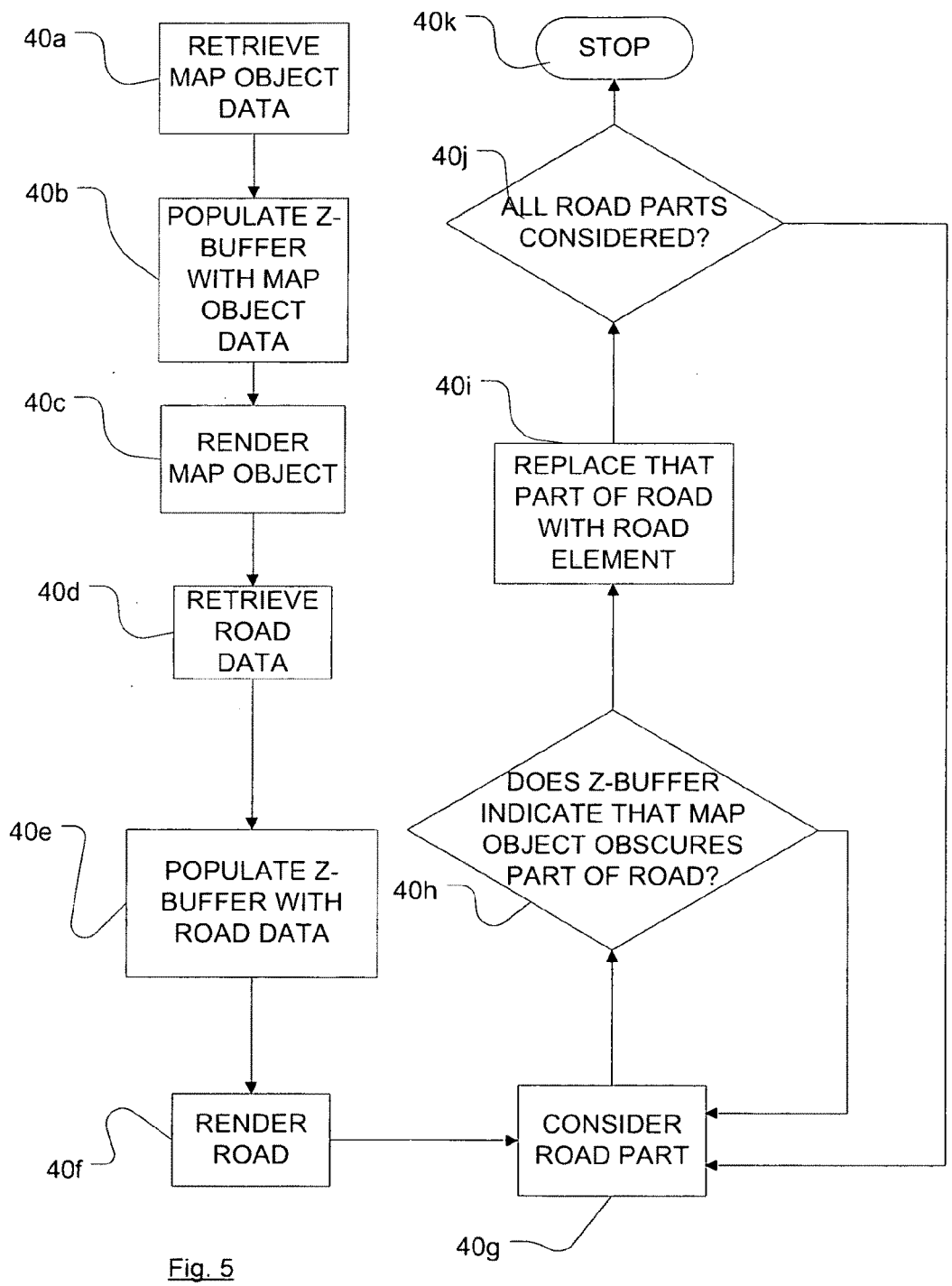
FIG. 5 is a flow diagram depicting the steps of an illustrative process in accordance with an embodiment of the invention.

In this modification of the process previously proposed in FIG. 5, the segments of road that are not obscured by the map data are drawn in step 40f, and the road data corresponding thereto is simultaneously copied to a stencil buffer in step 46.

Once the stencil buffer has been populated with road data that has been rendered in step 40f, the next step 48 is to re-render the road to draw road elements only in those locations of the stencil buffer that have not been populated with road data (i.e. those parts of the road that were not drawn in step 40f because they were obscured by the map object). The rendered road elements then are superposed on the map object in step 50 to provide a final image as depicted in FIG. 4c, following which the process terminates.

It will be appreciated from the foregoing, that these techniques provide a powerful means for providing the user of a navigation device with a clear map view that is easily interpreted, and these advantages can be provided without having to sacrifice any three-dimensional information content.

In one of the foregoing embodiments, the road comprises a route that has been calculated by a navigation device and which the user of the device is following. However, it is important to note that this is not the only circumstance where the teachings of the present invention prove useful.

Figure 7:
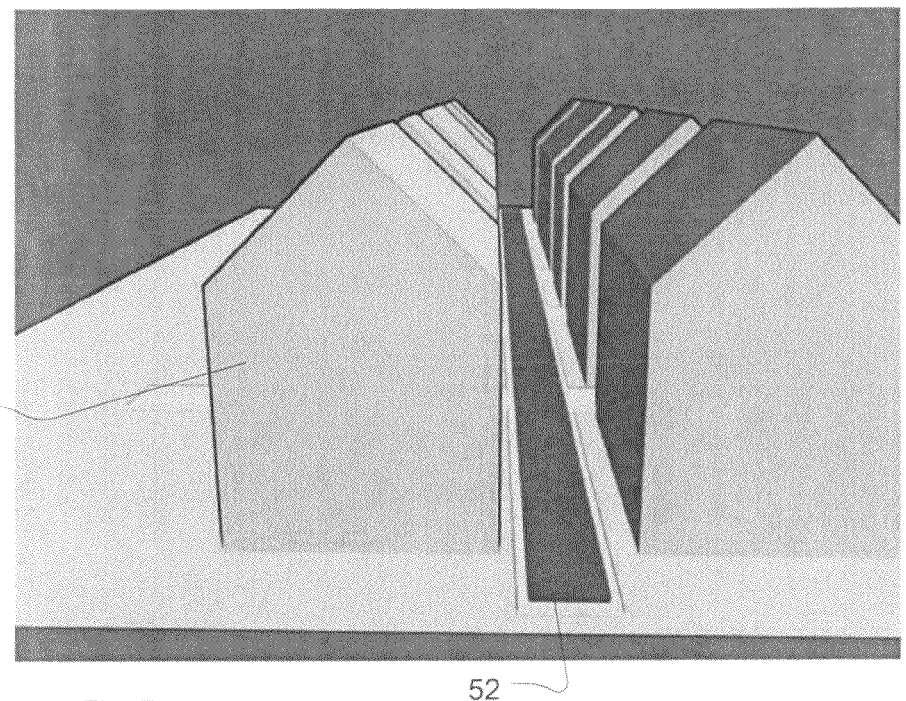
FIG. 7 is an illustrative screenshot of a display image.

Referring now to FIG. 7, there is depicted a schematic screenshot from a navigation device where the device is configured to provide a three-dimensional elevation view of a region of a digital map.

It is apparent from FIG. 7 that a calculated route 52 to be followed is reasonably visible and as such a user of the navigation device should not have too much trouble following that route.

However, if the user should decide to take a detour and, for example, take the fourth road on the left instead of following the route, it would be very difficult from the screenshot depicted in FIG. 7 to determine how far away the fourth road on the left is from their current position. The principal reason for this is that the map objects, in this instance the buildings 54, to the left of the route 52 obscure much, if not all, of the useful information regarding the roads adjoining the route.

Figure 8:
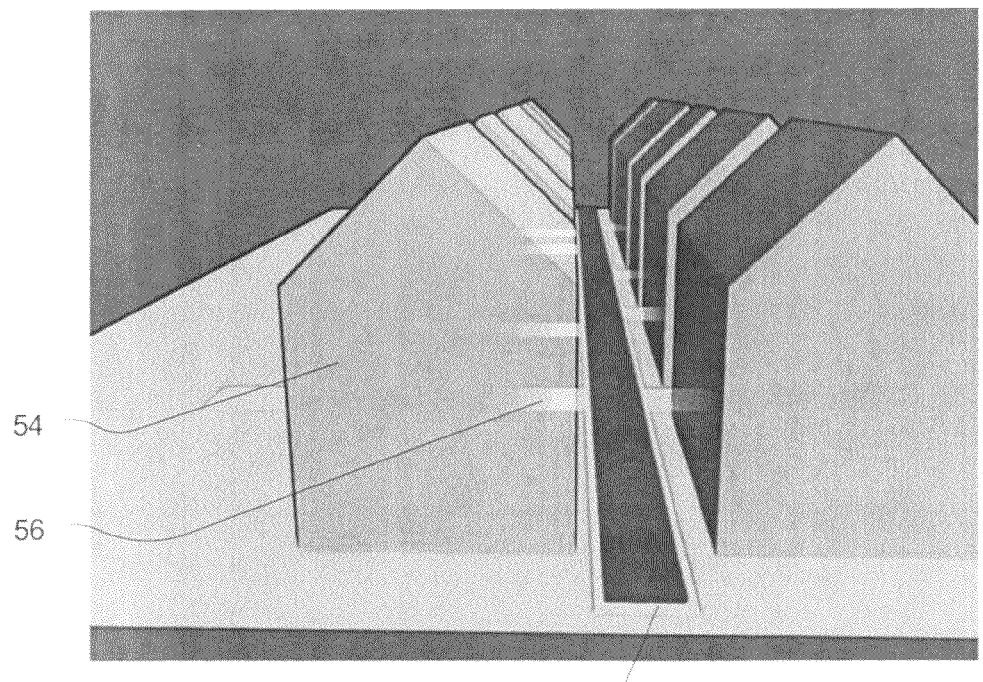
FIG. 8 is an illustrative screenshot of the display image depicted in FIG. 7 as adapted in accordance with the teachings of an embodiment of the invention generated by m

By implementing the z-buffer and/or stencil techniques described above it is possible to provide an enhanced three-dimensional perspective view, as depicted in FIG. 8, where the map objects, in this instance the buildings 54, are superposed with a road element that provides useful information regarding roads adjoining the route.

As these roads are ones that a user of the navigation device may not want to use, it is preferred to adopt a different type of road element to that previously proposed because providing a road element that extended all of the way through the buildings would unnecessarily complicate the overall display.

To this end it is preferred that the road element comprises a road stub 56 that gradually fades to zero intensity over a relatively short distance from the route, say in the order of 5 to 20 meters, preferably over 10 meters from the route. As shown in FIG. 8, each stub has a relatively high intensity adjacent to the route which fades as one moves progressively further away from the route 52.

As with the embodiment previously described, a road element is only displayed superposed on a map object when the road associated with that road element is obscured from view by the map object. For example, considering the first road on the left (closest to the viewing position) depicted in FIG. 8, in a first step data concerning map objects (e.g. the buildings 54) is retrieved from the digital map, used to populate a z-buffer and then rendered. Next road data concerning the first road on the left is retrieved and entered into the z-buffer before being rendered in a direction moving outwardly away from the route 52. The component parts of the road are then each considered and a determination is made as to whether the z-buffer indicates that the map object obscures (i.e. is closer to the viewing position) the particular part of road currently being considered.

If the map object is further away from the viewing position than the particular part of road data currently being considered, the data for that part is rendered and displayed, and the next road segment is considered. If, however, the determination is that the z-buffer indicates that the map object obscures the part of road currently being rendered, and that road part is within a predetermined distance of the last visible road part, then that part of the road is drawn in the map view as a road element that is superposed on the map object. If the road part should be determined to be more than a predetermined distance from the last visible road part, then the aforementioned stub is determined to have been completed and no further road elements are superposed on the map object whilst the road extends behind it.

To implement the aforementioned stencil buffer in this embodiment, the rendered road data from the z-buffer is copied to a stencil buffer, following which (as described in the previous embodiment) part of the road extending behind the map object is rendered as a road element and superposed on the map object.

An alternative, but similar, way to implement this functionality would be to consider successive road components moving outwardly from the route, and at the first component which is obscured by a map object (as determined by implementing the aforementioned z-buffer) to superpose a rendered road stub on the region of the map object that is relatively close (e.g. within 5 to 20 meters, preferably 10 meters) to the last road component that was not obscured. No further part of the road behind the map object would be displayed, and display of road components would only resume when those components are no longer obscured by the map object.

Figure 9:
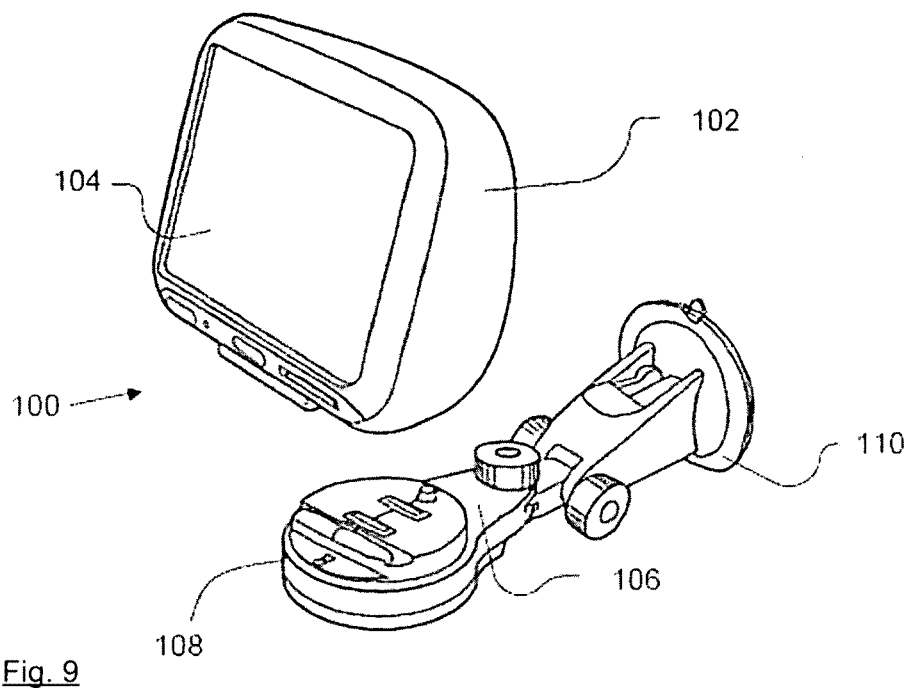
FIG. 9 is a schematic perspective view of a navigation apparatus.
Figure 10:
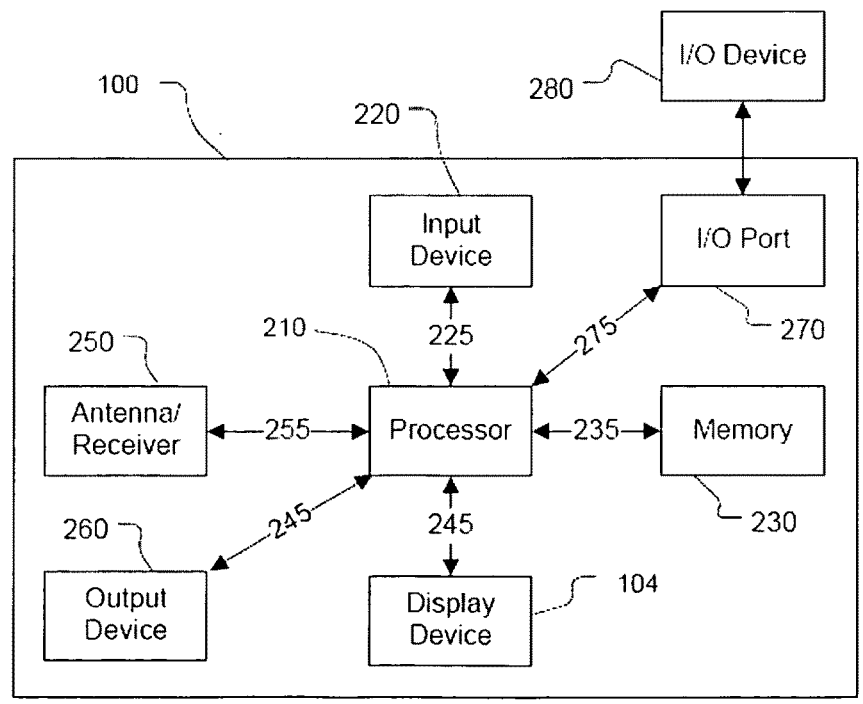
FIG. 10 is a schematic block diagram showing the navigation apparatus hardware.
Figure 11:
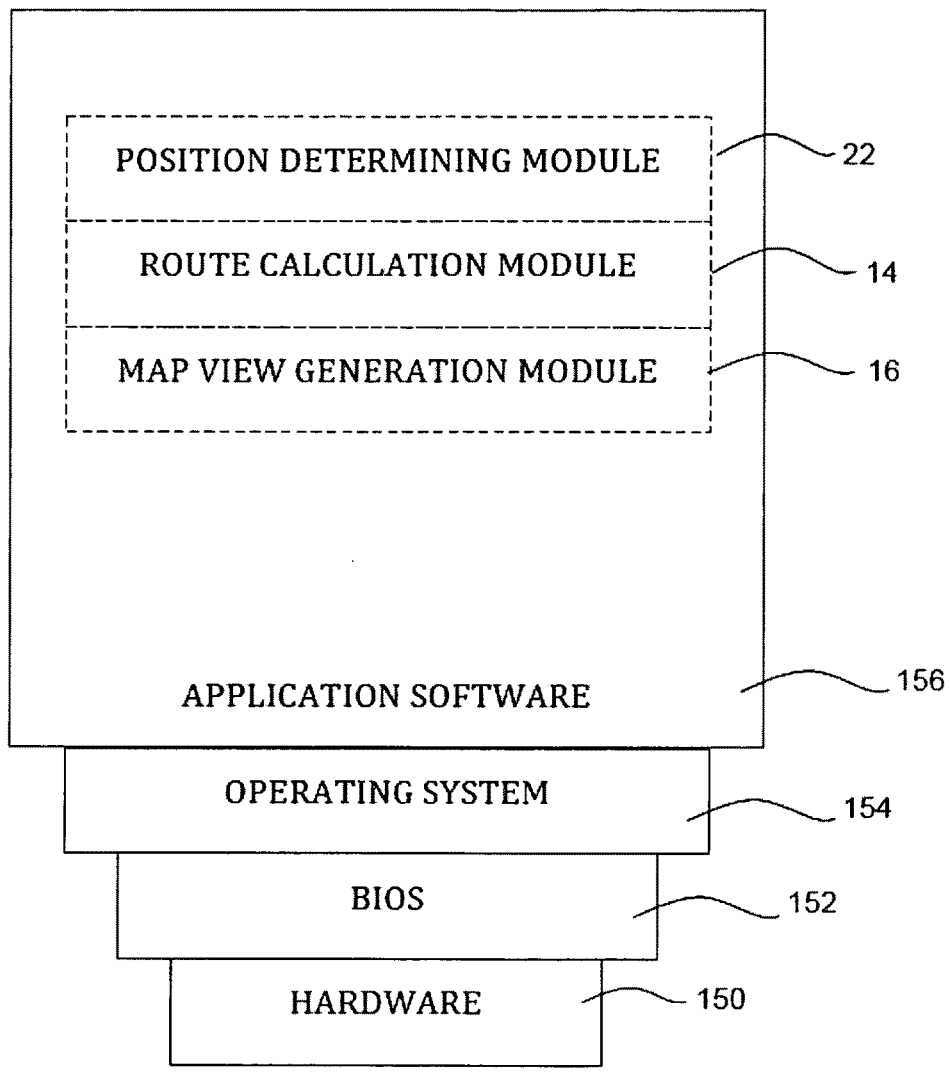
FIG. 11 is a schematic diagram showing a functional operative relation established by the hardware and software.

Having described the preferred functional techniques, FIGS. 9-11 now illustrate a physical apparatus or system for implementing one or more of these techniques. The system may comprise an autonomous device, such as a portable navigation device (PND), an in-vehicle navigation device, a portable map viewer, a device including a positioning system (for example, a satellite based positioning system such as a Global Positioning System (GPS)), a portable digital assistant (PDA), a portable computer, or non-portable computer. Alternatively, the system may comprise a server storing the digital map, and a remote terminal or computer configured to generate a display of the digital map based on information received from the server over one or more networks, such as an internet or intranet.

FIG. 9 depicts an example embodiment in the form of a PND 100. A PND is chosen as this represents the most challenging design in which design constraints such as confined display size, limited processing power and speed, as well as weight and power supply limitations, are most acute. The PND 100 generally comprises a housing 102 accommodating the PND's electronic hardware, including a display screen 104. The PND is made suitable for in-vehicle use by means of a dock bracket 106. The dock bracket 106 includes a coupling part 108 for releasable or separable docking engagement with a complementary coupling part on the housing 102. The bracket 106 further includes a mounting element 110, such as a suction cup or an adhesive pad, for attaching the bracket 106 to a suitable surface of the vehicle (not shown).

FIG. 10 is an illustrative representation of electronic components 152 of the navigation device 100, in block component format. It should be noted that the block diagram of the navigation device 100 is not inclusive of all components, but is only representative of many example components.

The navigation device 100 includes a processor 210 connected to an input device 220 and the display screen 104. The input device 220 can include a keyboard device, voice input device, touch panel and/or any other known input device utilised to input information; and the display screen 104 can include any type of display screen such as an LCD display, for example. In a particularly preferred arrangement the input device 220 and display screen 104 are integrated into an integrated input and display device, including a touchpad or touchscreen input so that a user need only touch a portion of the display screen 104 to select one of a plurality of display choices or to activate one of a plurality of virtual buttons.

The navigation device may include an output device 260, for example an audible output device (e.g. a loudspeaker). As output device 260 can produce audible information for a user of the navigation device 100, it is should equally be understood that input device 220 can include a microphone and software for receiving input voice commands as well.

In the navigation device 100, processor 210 is operatively connected to and set to receive input information from input device 220 via a connection 225, and operatively connected to at least one of display screen 104 and output device 260, via output connections 245, to output information thereto. Further, the processor 210 is operatively connected to memory 230 via connection 235. The memory 230 can include any suitable media, including non-volatile memory and/or volatile memory, writable and/or read-only memory, semiconductor memory (such as RAM and/or FLASH), magnetic memory, such as a magnetic disc, and optical memory, such as an optical disc. The memory 230 stores various information including executable software, and the digital map 10 discussed above.

The processor 210 is further configured to receive/send information from/to input/output (I/O) ports 270 via connection 275, wherein the I/O port 270 is connectible to an I/O device 280 external to the navigation device 100. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 100 and the internet or any other network for example, and/or to establish a connection to a server via the internet or some other network for example.

FIG. 10 further illustrates an operative connection between the processor 210 and an antenna/receiver 250 via connection 255, wherein the antenna/receiver 250 can be configured for receiving positioning system signals (such as GPS signals or other radio or satellite signals) from which the current real-time position of the navigation device 100 can be determined in a known manner. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 10 are powered by power sources (not shown) in a conventional manner. As will be understood by one of ordinary skill in the art, different configurations of the components shown in FIG. 10 are considered to be within the scope of the present application. For example, the components shown in FIG. 10 may be in communication with one another via wired and/or wireless connections and the like. Also, although the connections are shown as independent of each other, some or all of the connections may share one or more communication buses.

Referring to FIG. 11, the processor 210 and memory 230 cooperate to establish a BIOS (Basic Input/Output System) 150 that functions as an interface between the functional hardware components 152 of the navigation device 100 and the software executed by the device. The processor 210 then loads from memory 230 an operating system 154 which provides an environment in which application software 156 can run.

Depending on the functionality provided by the navigation device 100, the application software 156 may include one or more of: the position determining module 22; the route-calculation module 14; and the map view generation module 16 implementing a three-dimensional perspective elevation in which the display format for a three dimensional map object is controlled in dependence on whether the map objected is judged to obscure a line of sight to route information in the map view.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method for generating a display image including a map view and a road adjoining a calculated route, the map view being a three dimensional perspective elevation view of a portion of a digital map as viewed from a viewing position, the method comprising:
   determining, from information associated with a distance of the road that is to be displayed in the display image from the viewing position, whether a map object obscures a line of sight from the viewing position to the road in the three dimensional perspective elevation; and
   displaying an element of the road in a format that is dependent on the determination of whether the map object is determined to obscure the line of sight, wherein in response to determining that the map object obscures the line of sight, displaying the road element in a format that permits simultaneous viewing of the road element and map object, wherein the road element comprises a stub extending to encompass a part of the road that is obscured by said map object.

2. The method of claim 1, wherein the displaying comprises, in response to determining that the map object obscures the line of sight, displaying the road element superposed on said map object.

3. The method of claim 1, wherein the format is selected from at least one of: an at least partly transparent format, and/or a stippled or patterned format.

4. The method of claim 1, wherein said stub extends a predetermined distance behind the map object from a side thereof closest the route.

5. The method of claim 1, wherein said determining comprises implementing z-buffer functionality to determine which of said road or said map object are closer to said viewing position.

6. The method of claim 5, wherein subsequent to implementing z-buffer functionality to determine which of said road or said map object are closer to said viewing position, the road is redrawn substituting said map element for at least part of said road that is obscured by said map object.

7. The method of claim 5, wherein data defining said road is copied from said z-buffer to a stencil buffer, the stencil buffer determining which part of said road is displayed in a different format.

8. The method of claim 1, wherein the displaying comprises, in response to determining that that the map object obscures the line of sight, displaying the road element in a format that permits simultaneous viewing of the road element and map object.

9. The method of claim 1, wherein the displaying comprises, in response to determining that that the map object obscures the line of sight, displaying the road element in a format that permits simultaneous viewing of the road element and map object.

10. The method of claim 9, wherein said road comprises a calculated route from a first location to a second location.

11. The method of claim 2, wherein the format is selected from at least one of: an at least partly transparent format, and a stippled or patterned format.

12. The method of claim 1 wherein said road further comprises said calculated route, and wherein a further road element which forms part of said calculated route extends to encompass the entire road that is obscured by the map object.

13. A non-transitory computer readable medium, comprising executable software which, when executed by a computer processor, implements a method for generating a display image including a map view and a road adjoining a calculated route, the map view being a three dimensional perspective elevation view of a portion of a digital map as viewed from a viewing position, the method comprising:
   determining, from information associated with a distance of the road that is to be displayed in the display image from the viewing position, whether a map object obscures a line of sight from the viewing position to the road in the three dimensional perspective elevation; and
   displaying an element of the road in a format that is dependent on the determination of whether the map object is determined to obscure the line of sight, wherein in response to determining that the map object obscures the line of sight, displaying the road element in a format that permits simultaneous viewing of the road element and map object, wherein the road element comprises a stub extending to encompass a part of the road that is obscured by said map object.

14. The computer readable medium of claim 13, wherein said road is configured to gradually fade in intensity over a predetermined distance from an intersection point of the road and map object.

15. Route navigation apparatus configured to generate a display image including a map view and a road adjoining a calculated route, the map view being a three dimensional perspective elevation view of a portion of a digital map as viewed from a viewing position, the apparatus comprising:
   a processor to determine, from information associated with a distance of the road that is to be displayed in the display image from the viewing position, whether a map object obscures a line of sight from said viewing position to the road in the three dimensional perspective elevation; and
   a display to display an element of the road in a format that is dependent on whether the map object is determined to obscure the line of sight, wherein in response to determining that the map object obscures the line of sight, the display displays the road element in a format that permits simultaneous viewing of the road element and map object, wherein the road element comprises a stub extending to encompass a part of the road that is obscured by said map object.

16. The apparatus of claim 15, wherein said road further comprises the calculated route and wherein a further road element which forms part of said calculated route extends to encompass the entire road that is obscured by the map object.

* * * * *